US005139176A

United States Patent [19]

Reindl et al.

[11] Patent Number: 5,139,176

[45] Date of Patent: Aug. 18, 1992

[54] APPARATUS FOR METERED FILLING OF TONER FROM A RESERVOIR INTO THE DEVELOPING STATION OF A PRINTER OR COPIER DEVICE

[75] Inventors: Peter Reindl, Wilheim; Albert Eben, Hoehenkirchen, both of Fed. Rep. of Germany

[73] Assignee: Siemens Aktiengesellschaft, Munich, Fed. Rep. of Germany

[21] Appl. No.: 566,377

[22] PCT Filed: Mar. 2, 1988

[86] PCT No.: PCT/DE88/00110

§ 371 Date: Aug. 30, 1990

§ 102(e) Date: Aug. 30, 1990

[87] PCT Pub. No.: WO89/08284

PCT Pub. Date: Sep. 8, 1989

[51] Int. Cl.[5] .............................................. G01F 11/20

[52] U.S. Cl. .................................... 222/238; 222/412; 222/DIG. 1; 355/260; 366/156; 366/158; 366/320

[58] Field of Search ............... 355/245, 251, 252, 253, 355/255, 259, 260; 118/653, 656, 657, 658; 222/DIG. 1, 406, 412, 413, 414; 366/238, 156, 158, 320

[56] References Cited

U.S. PATENT DOCUMENTS

| | | | |
|---|---|---|---|
| 3,310,205 | 3/1967 | Meyer | 222/412 X |
| 4,682,874 | 7/1987 | Fantuzzo | 118/653 X |

FOREIGN PATENT DOCUMENTS

| | | | |
|---|---|---|---|
| 0007047 | 1/1980 | European Pat. Off. . | |
| 0071415 | 2/1983 | European Pat. Off. . | |
| 2644097 | 4/1978 | Fed. Rep. of Germany . | |
| 3005833 | 8/1981 | Fed. Rep. of Germany | 118/653 |
| 3225870 | 1/1984 | Fed. Rep. of Germany . | |
| 3620365 | 12/1987 | Fed. Rep. of Germany . | |
| 61-99176 | 5/1986 | Japan | 355/260 |
| 62-49381 | 3/1987 | Japan | 355/260 |
| 2065617 | 7/1981 | United Kingdom . | |

OTHER PUBLICATIONS

Goff, Jr., "Toner Cartridge with Internal Toner Transport", IBM Tech. Disc. Bulletin, vol. 15, No. 4, Sep. 1972, p. 1260.

Japanese Patent Abstract, No. (11) 60-238874 (A), vol. 10, (P-44), Apr. 22, 1986.

*Primary Examiner*—A. T. Grimley
*Assistant Examiner*—Shuk Y. Lee
*Attorney, Agent, or Firm*—Hill, Van Santen, Steadman & Simpson

[57] ABSTRACT

An apparatus for metered filling of toner from a reservoir into the developing station of an electrophotographic printer device comprises a metering drum in the exit region of the reservoir. A hollow conveyor helix is situated in a conveyor tube above the metering drum. The conveyor helix extends parallel along the metering drum into the toner reservoir. The conveyor helix and the metering drum are coupled in terms of drive corresponding to the metering power.

8 Claims, 1 Drawing Sheet

Figure 2:
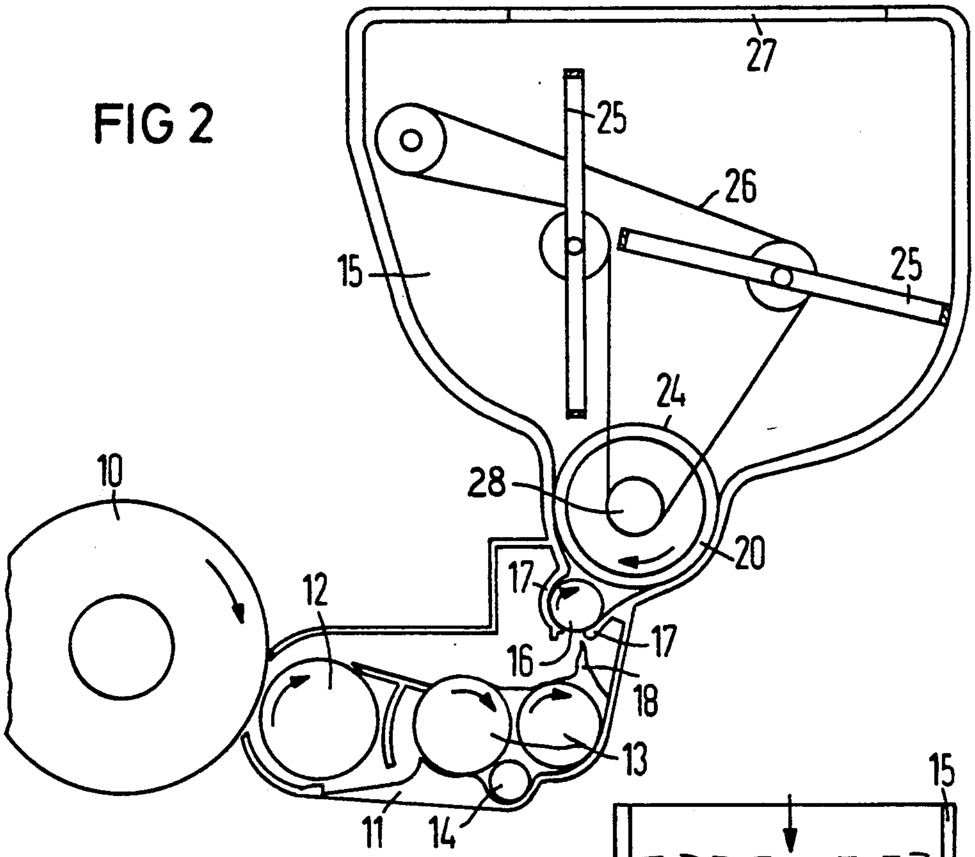

APPARATUS FOR METERED FILLING OF TONER FROM A RESERVOIR INTO THE DEVELOPING STATION OF A PRINTER OR COPIER DEVICE

The invention is directed to an apparatus for metered filling of toner from a reservoir into the developing station of a non-mechanical printer or copier device.

In copier device technology and in non-mechanical, fast data printers that operate on the principle of electro photography, charge images are generated on a charge image carrier, for example a photoconductive drum, and are subsequently inked with a toner in a developing station. Given employment of a photoconductive drum, the toner images are subsequently transferred onto standard paper and are thermically or chemically fixed thereon. As a rule, a two-component developer that is composed of ferromagnetic carrier particles and toner particles is employed for developing. With, for example, a magnetic brush arrangement, the developer mix is conducted past the charge image carrier (photoconductive drum) to which the toner particles remain adhering due to electrostatic forces. The returning mix is enriched with new toner from the toner reservoir before it flows back into the circulation of the carpet of mix in the developing station.

In order to achieve a uniform inking of the charge image via the developing station, the developing station must be uniformly supplied with toner in metered fashion over the entire width of the developing station. In the metered delivery of toner to the developer mix, the mechanical stressing on the toner must be minimum so that work can still be carried out disruption-free in the limit temperature range of the toner and so that clumping of the toner is prevented.

For delivering toner to a developing station in metered fashion, German Published Application 36 20 365 discloses that a conveyor means be provided that is composed of two elastic drums arranged between the walls of the exit region of the reservoir, these elastic drums closing the exit region and being oppositely driveable via an electromotive drive means.

Further, British Patent Application 2 065 617 A discloses that the toner reservoir be arranged laterally from the developing station and that the toner be supplied in a closed conveying tube via a screw-shaft.

What is referred to as roller formation of the toner can arise in the conveying tube due to the employment of a screw-shaft. This means that the toner assumes the shape of the conveying drum and forms clumps. The toner is also subject to a relatively high mechanical stressing.

A further disadvantage of a lateral delivery of toner to the developing station is comprised therein that a depletion of the developer mix occurs at the opposite end of the developing station given a high toner consumption.

It is an object of the invention to fashion an apparatus of the species initially cited such that the toner is metered into the developing station over the entire printing width without great mechanical stressing, being metered uniformly and free of clumps and independently of the toner supply in the reservoir.

In an apparatus of the species initially cited, this object is achieved by at least one metering drum extending along the developing station and arranged in the exit region of the toner reservoir to the developing station; a hollow conveyor helix situated in a conveying channel above the metering drums in optimally tight proximity thereto; the conveyor helix extending parallel along the metering drum into the toner reservoir; and the conveyor helix and the metering drum being coupled in terms of drive corresponding to the metering power such that an approximately uniformly high toner level is established above the metering drum.

Advantageous embodiments of the invention are provided by the conveyor helix being fashioned as a coil spring that has at least one end coupled to a central drive shaft. In a preferred embodiment, the conveyor helix is arranged in a conveyor tube that is open at one side in the region of the metering drum.

Ductors, such as ductor hoops which are oppositely driven, may be provided in the toner reservoir above the conveyor helix to brush the housing side wall of the toner reservoir.

The conveyor helix and the metering drum are preferrably driven in opposite directions.

According to the invention, a conveyor helix is arranged above the metering drums in close proximity thereto. The conveyor helix extends over the metering drum and into the reservoir and conveys the toner out of the reservoir and uniformly over the metering drum.

The drive of the metering drum and the conveyor helix are coupled. The conveyor helix thereby moves significantly slower than the metering drum.

Due to the slow movement and the large dimensioning, a minimum toner stressing with extremely low thermal stressing due to frictional energy derives.

The employment of a conveyor helix that can be fashioned as a spring helix in an advantageous embodiment of the invention prevents the toner from forming arches over the metering drum since the toner is constantly cleared away by the conveyor helix.

The conveyed quantity is independent of the filling level in the toner reservoir. It is thus possible to employ large reservoirs into which toner can be refilled without interrupting printing operations.

Due to the constant quantity of conveyed toner over the rotational angle of the conveyor helix, the conveyed quantity can be infinitely varied from nearly 0 through several kilograms per hour by clocking the drive.

Figure 1:
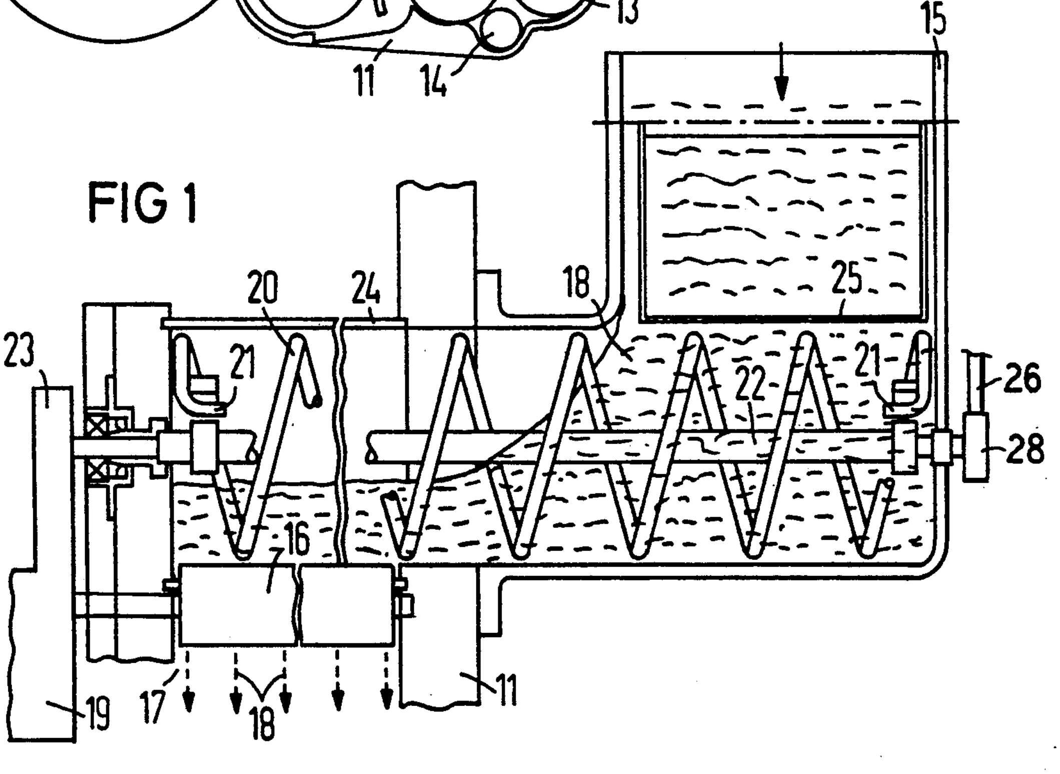

Embodiments of the invention are shown in the drawings and shall be set forth in greater detail below by way of example. Shown are:

FIG. 1 a schematic illustration of the metering device for an electrophotographic printer means, shown in longitudinal section; and FIG. 2 a schematic illustration of the metering device in cross-section.

A printer device operating on the principle of electrophotography contains a photoconductive drum 10 as a charge carrier. The charge image situated on the photoconductive drum is inked with the assistance of a developing station 11, being inked with a two-component developer mix composed of carrier particles and of toner particles. The developing station 11 contains a magnetic drum 12 for inking the photoconductive drum as a application drum and contains two mixing drums 13 moving in the same direction (the arrow direction for blending the mixture). Further, an emptying drum 14 is arranged at the floor of the developing station 11, the used toner mixture being capable of being removed from the developing station via this emptying drum 14 from time to time.

Whereas the ferromagnetic carrier particles fundamentally remain in the developing station, the toner particles are consumed for inking the charge images. These toner particles, referred to as "toner" in brief, must be supplied to the developing station 11 in metered fashioned from a toner reservoir 15, being supplied via a metering means dependent on the printer use.

A metering drum 16 of metal or foamed material or some other soft plastic that extends over the entire printer width and, thus, over the width of the developing station and its mixing drums 13 is provided as the metering device. The metering drum 16 is rotatably arranged between the walls 17 of the exit region of the reservoir 11. It completely seals the exit region of the toner reservoir 15. By turning the metering drum 16, toner 18 is conveyed between the walls 17 and the drum 16 in metered fashion and is supplied to the developing station 11. The metering drum 16 is rotatably seated in the walls 17 of the toner reservoir or, respectively, of the developing station and is driven via a motor 19.

A conveyor helix 20 for supplying the toner to the metering drum is arranged in tight proximity above the metering drum 16. The conveyor helix is composed of a coil spring, i.e. of an elastic, axially prestressed material, that has its ends 21 secured to a drive shaft 22. The drive shaft 22 is in turn seated in the walls of the toner reservoir 15 and is coupled to the motor 19 of the metering drum via a gearing arrangement 23.

The conveyor helix is arranged in a conveyor tube 24 that is open at one side in the region of the metering drum.

The conveyor helix is situated immediately above the metering drum in close proximity thereto and extends parallel to the metering drum into the actual toner reservoir.

The toner reservoir 15 itself comprises two oppositely rotating ductors 25 that brush along the walls of the toner reservoir 15 and thus prevent the toner from adhering to the walls of the toner reservoir. The ductors 25 are thereby driven by the conveyor helix 20 via a belt drive 26 and a pulley 28.

The toner reservoir 15 comprises a filling opening 27 via which toner is poured into the toner reservoir 15 from portable containers.

The toner poured into the toner reservoir 15 distributes inside the conveyor helix or, respectively, the conveyor tube 24 such that a toner level of $\frac{1}{3}$ through $\frac{1}{2}$ of the tube diameter of the conveyor tube 24 is established over the metering drum. This toner level depends on the metering power of the metering drum and the latter is in turn dependent on the transmission ratio of the gearing arrangement 23 between the metering drum 16 and the conveyor helix 20. In the illustrated exemplary embodiment, this ratio amounts to 27:1, i.e. the speed of the metering drum is 27 times higher than that of the conveyor helix 20. In order to enable these extremely slow speeds of the conveyor helix 20 to be achieved, the gearing 23 is fashioned as a crank gear having a freewheel on the conveyor helix. However, any other gearing having a corresponding transmission ratio can also be employed.

In an advantageous embodiment of the invention, the conveyor helix 20 is composed of a wire having a diameter of 4 mm. It has an outside diameter of 68 mm and a pitch of 34 mm and is arranged in a conveyor tube 24 having an inside diameter of 70 mm. A conveyor helix and metering drum composed of foamed material and having a diameter of 24 mm are at a distance of 1 through 2 mm from one another.

As already set forth, it is also possible to provide a metering drum of metal having notches, recesses or the like instead of providing a metering drum composed of foamed material or of some other soft plastic.

The conveyed quantity of the metering means is constant over the rotational angle of the conveyor helix 20 and is dependent only on the speed of the conveyor helix or, respectively, on the ratio of the speeds and of the dimensioning of the metering drum and conveyor helix.

A uniform toner level can build up over the metering drum 16 because the conveyor helix is hollow. This toner level that should have between $\frac{1}{3}$ and $\frac{1}{2}$ of the tube diameter of the conveyor tube 24 is independent of the level of the toner in the actual toner reservoir 15. The conveyed quantity is thus independent of the filling level of toner in the toner reservoir. Large reservoirs can therefore be employed that can be refilled with toner without interrupting printer operations.

Dependent on the printer use, the quantity of toner supplied to the developer station can be varied by varying the speed of the drive of conveyor helix and metering drum.

The conveyor helix 20 brushes the metering drum 16 at a tight spacing of 1 through 2 mm. No cavities in the toner, what are referred to as arches, can thereby form over the metering drum, since these arches are constantly cleared away by the conveyor helix.

In the illustrated exemplary embodiment, a single metering drum 16 is arranged in the exit region of the toner reservoir 15. However, it is also possible, for example, to provide two oppositely running metering drums.

Although other modifications and changes may be suggested by those skilled in the art, it is the intention of the inventors to embody within the patent warranted hereon all changes and modifications as reasonably and properly come within the scope of their contribution to the art.

We claim:

1. An apparatus for metered filling of toner from a toner reservoir into a developing station of a non-mechanical printer or copier device, comprising the following features:

a) at least one metering drum extending along the developing station is arranged in an exit region of the toner reservoir to the developing station;

b) a hollow conveyor helix mounted in a conveying channel above said at least one metering drum in optimally tight proximity thereto;

c) the hollow conveyor helix extends parallel along the metering drum into the toner reservoir;

d) means for providing a substantially constant rotation ratio between said hollow conveyor helix and said metering drum corresponding to a metering rate of said at least one metering drum such that an approximately uniform high toner level is established above said at least one metering drum.

2. An apparatus according to claim 1, wherein said hollow conveyor helix comprises: a central drive shaft, and a coil spring that has at least one end coupled to said central drive shaft.

3. An apparatus according to claim 2, further comprising: a conveyor tube that is open at one side in a region of the metering drum, said hollow conveyor helix being mounted in said conveyor tube.

4. An apparatus according to claim 1, further comprising: ductors that brush a housing side wall of the toner reservoir arranged in the toner reservoir above the hollow conveyor helix, and means for driving said ductors in opposite directions.

5. An apparatus according to claim 1, further comprising: means for driving said hollow conveyor helix and said metering drum in opposite directions.

6. An apparatus as claimed in claim 1, wherein said means for providing a substantially constant rotation ration includes a gear arrangement connected between said at least one metering drum and said hollow conveyor helix.

7. An apparatus for metered filling of toner from a toner reservoir into a developing station of a non-mechanical printer or copier device, comprising:

a metering drum at an exit of the toner reservoir leading to the developing station and being rotatable mounted for metered feeding of toner from the toner reservoir to the developing station when said metering drum is rotated;

a hollow helical conveyor mounted adjacent said metering drum and being rotatable to convey toner from the reservoir to said metering drum when said hollow helical conveyor is rotated, said hollow helical conveyor including a helical coil with a hollow central portion, said helical coil being mounted to a central shaft;

two ductors mounted adjacent said hollow helical conveyor in the reservoir and being rotatable to loosen toner in the reservoir for feeding to said hollow helical conveyor; and a drive means for driving said metering drum and said hollow helical conveyor to provide a substantially constant rotation ratio between rotation of said metering drum and rotation of said hollow helical conveyor.

8. An apparatus as claimed in claim 7, wherein said drive means drives said two ductors.

* * * * *